(12) United States Patent
Williams

(10) Patent No.: US 10,479,476 B1
(45) Date of Patent: Nov. 19, 2019

(54) AEROFOIL BODY WITH INTEGRAL CURVED SPAR-COVER

(71) Applicant: AIRBUS OPERATIONS LIMITED, Bristol (GB)

(72) Inventor: Richard Geoffrey Williams, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 16/444,785

(22) Filed: Jun. 18, 2019

Related U.S. Application Data

(62) Division of application No. 15/599,648, filed on May 19, 2017.

(30) Foreign Application Priority Data

May 19, 2016 (GB) ...................... 1608837

(51) Int. Cl.
| | |
|---|---|
| *B64C 1/26* | (2006.01) |
| *B64C 3/18* | (2006.01) |
| *B64C 1/06* | (2006.01) |
| *B29C 70/30* | (2006.01) |
| *B64C 3/58* | (2006.01) |
| *B29K 105/08* | (2006.01) |
| *B29K 307/04* | (2006.01) |
| *B29L 31/30* | (2006.01) |

(52) U.S. Cl.
CPC .............. *B64C 3/185* (2013.01); *B29C 70/30* (2013.01); *B64C 1/065* (2013.01); *B64C 1/26* (2013.01); *B64C 3/58* (2013.01); *B29K 2105/0872* (2013.01); *B29K 2307/04* (2013.01); *B29L 2031/3085* (2013.01); *Y02T 50/43* (2013.01)

(58) Field of Classification Search
CPC .. B64C 3/185; B64C 3/20; B64C 3/24; B64C 1/065; B64C 1/26; B29L 2031/3085; Y02T 50/43
USPC ...................................... 244/123.3
See application file for complete search history.

(56) References Cited

U.S. PATENT DOCUMENTS

| | | |
|---|---|---|
| 3,775,238 A | 11/1973 | Lyman |
| 3,995,081 A | 11/1976 | Fant |

(Continued)

FOREIGN PATENT DOCUMENTS

| | | |
|---|---|---|
| CA | 2789363 | 8/2011 |
| CA | 2831516 | 5/2014 |

(Continued)

OTHER PUBLICATIONS

Great Britain Communication in GB Application No. 1608837.9, dated Nov. 16, 2016.

(Continued)

*Primary Examiner* — Christopher P Ellis
(74) *Attorney, Agent, or Firm* — Nixon & Vanderhye P.C.

(57) ABSTRACT

An aerofoil shaped body includes a plurality of longitudinal spars, an upper aerofoil cover, and a lower aerofoil cover. The spars and the covers are made of composite laminate material. One of the spars is integrally formed with one of the covers to form a spar-cover such that the composite laminate material of the spar extends continuously into the cover through a fold region created between the spar and the cover. The fold region has a fold axis extending substantially in the longitudinal direction, and the fold axis projected onto two orthogonal planes has curvature in both those planes.

19 Claims, 7 Drawing Sheets

(56) References Cited

U.S. PATENT DOCUMENTS

| | | |
|---|---|---|
| 4,662,587 A | 5/1987 | Whitener |
| 5,038,291 A | 8/1991 | Wang et al. |
| 5,474,631 A | 12/1995 | Bowman |
| 5,735,486 A | 4/1998 | Piening |
| 6,190,484 B1 | 2/2001 | Appa |
| 2002/0011540 A1 | 1/2002 | De Castro Nodal |
| 2003/0042364 A1 | 3/2003 | Tanaka et al. |
| 2003/0192990 A1 | 10/2003 | Simpson |
| 2006/0073309 A1 | 4/2006 | Hogg |
| 2006/0249626 A1 | 11/2006 | Simpson |
| 2009/0261199 A1 | 10/2009 | McCarville |
| 2011/0168324 A1 | 7/2011 | Ender |
| 2012/0211607 A1 | 8/2012 | Sanderson et al. |
| 2012/0213640 A1 | 8/2012 | Sanderson et al. |
| 2013/0001360 A1 | 1/2013 | Wildman |
| 2013/0036922 A1 | 2/2013 | Stewart et al. |
| 2013/0099058 A1 | 4/2013 | Payne |
| 2013/0206324 A1 | 8/2013 | Blot et al. |
| 2013/0236686 A1 | 9/2013 | Horibe |
| 2014/0322381 A1 | 10/2014 | Bland |
| 2015/0203187 A1 | 7/2015 | Johnson et al. |
| 2016/0039513 A1 | 2/2016 | Pitman |
| 2016/0176499 A1 | 6/2016 | Evans |
| 2016/0311518 A1 | 10/2016 | Wiebe |
| 2018/0022439 A1 | 1/2018 | Stanley |
| 2018/0086429 A1 | 3/2018 | Sheppard |
| 2018/0155004 A1 | 6/2018 | Woolcock |
| 2018/0362143 A1 | 12/2018 | Bhatia |
| 2019/0118930 A1 | 4/2019 | Steadman |

FOREIGN PATENT DOCUMENTS

| | | |
|---|---|---|
| CA | 3006559 | 6/2017 |
| DE | 102005015337 | 10/2006 |
| EP | 1288124 | 3/2003 |
| EP | 2492086 | 8/2012 |
| EP | 2492087 | 8/2012 |
| EP | 2716544 | 4/2014 |
| EP | 2786932 | 10/2014 |
| EP | 2842867 | 3/2015 |
| EP | 2982598 | 2/2016 |
| EP | 3272646 | 1/2018 |
| WO | 200220256 | 3/2002 |
| WO | 2013022534 | 2/2013 |
| WO | 2014053816 | 4/2014 |

OTHER PUBLICATIONS

European Search Report for Application No. 17169235, dated Nov. 8, 2017, 7 pages.

European Search Report for related European Patent Application No. 18173013.6 eight pages, dated Sep. 28, 2018.

AEROFOIL BODY WITH INTEGRAL CURVED SPAR-COVER

CROSS RELATED APPLICATIONS

The present application is a Divisional of U.S. patent application Ser. No. 15/599,648, filed May 19, 2017, now allowed, which claims priority from Great Britain Application Number 1608837.9, filed May 19, 2016, the entire contents of each of which are hereby incorporated by reference.

FIELD OF THE INVENTION

The present invention relates to an aerofoil shaped body; particularly, though not exclusively, an aircraft wing or winglet.

BACKGROUND OF THE INVENTION

An aerofoil shaped body is a three dimensional body having an aerofoil cross section (2-D), and is otherwise known as a 3-D aerofoil. Aerofoil bodies typically include a torsion box comprising upper and lower covers (or skins) on either side of a frame comprising spanwise spars and chordwise ribs. At least one spar is provided for each wing, although two or more is more common. In an aircraft wing, the torsion box is otherwise known as a wing box. The covers may also be reinforced with stringers, extending generally spanwise.

Traditionally extensive use has been made of lightweight metallic materials such as Aluminium in aircraft wing design. Mainly for ease of manufacture, the spars are conventionally substantially straight. In recent years there has been a move towards ever increasing use of composite materials, particularly fibre reinforced polymer matrix composites such as carbon fibre reinforced plastic (CFRP), in aircraft wings to replace more conventional metallic materials such as aluminium. Composite materials open up many manufacturing possibilities that have previously constrained traditional metallic aircraft design.

The leading and trailing edge regions of an aircraft wing are typically used to house a variety of aircraft systems and components, including leading and trailing edge high lift devices, wiring, etc. With straight spars, one or more highly space constrained pinch points may arise. On some aircraft wing designs a kink may be imposed on the spar to create to overcome a space constraint issue. Nevertheless a kinked spar still comprises two substantially straight portions either side of the kink. The joints between the straight spar sections typically necessitates joint plates which add weight, complexity and cost. This is true of current metallic and composite spar designs.

Current composite aircraft wing design comprises separate covers and spar manufacture which are then assembled together.

Reducing parts count and assembly time is of significant interest for high production rates.

SUMMARY OF THE INVENTION

A first aspect of the invention provides an aerofoil shaped body comprising a plurality of longitudinal spars, an upper aerofoil cover, and a lower aerofoil cover, the spars and the covers comprising composite laminate material, wherein at least one of the spars is integrally formed with one of the covers to form a spar-cover such that the composite laminate material of the spar extends continuously into the cover through a fold region created between the spar and the cover, and wherein the fold region has a fold axis extending substantially in the longitudinal direction, and the fold axis projected onto two orthogonal planes has curvature in both those planes.

A further aspect of the invention provides a method of manufacturing an aerofoil shaped body according to the first aspect of the invention, comprising laying up a plurality of composite laminate plies to form a first spar-cover, laying up a plurality of composite laminate plies to form a second spar-cover, and bringing the first spar-cover and the second spar-cover together to form a torsion box of the aerofoil shaped body.

An aerofoil shaped body is in the present context a three-dimensional aerofoil. A composite laminate material is in the present context a material comprising a plurality of plies, each ply having a combination of a matrix material and a reinforcement material. Integrally forming the spar and cover to form a spar-cover means that the spar and cover are not manufactured as separate components that are then joined together, but are manufactured as one component with the composite laminate material of the spar extends continuously into the cover without a break. However it should be noted that since the composite laminate material will include several plies, not all plies are required to extend from the spar into the cover and vice versa. It is sufficient that at least some plies extend from the spar into the cover through the fold region.

The fold axis is a curved line. The fold axis has curvature when projected onto two orthogonal planes. The orthogonal projection of the fold axis onto a plane generates a curved line in that plane. The orthogonal projection of the fold axis onto two orthogonal planes generates a curved line in both those planes.

The invention is advantageous in that the spar and cover can be integrally formed, reducing parts count compared with a conventional aerofoil body have separately manufactured spars and covers which are assembled together. For conformity of the composite laminate material through the fold region without 'ply spread' or 'ply bunching' the resulting spar and cover both necessarily have curvature. In planform (i.e. vertically from above along the z-axis of a cartesian coordinate system) the spar of the aerofoil shaped body is curved. Looking aft (i.e. horizontally from in front along the x-axis) the cover of the aerofoil shaped body has dihedral (or anhedral) curvature. The spar has no kink. The invention improves manufacturability.

The invention may be applied to a variety of aerofoil bodies particularly for aircraft, including: wings, wing tips (including winglets, downlets, raked tips, etc.), control surfaces and high lift devices (including flaps, slats, ailerons, horizontal and vertical tailplanes etc.).

The two orthogonal planes may comprise a horizontal x-y plane and a vertical y-z plane, where the x-axis is in the fore-aft direction, the y-axis is in the transverse direction perpendicular to the x-axis, and the z-axis is vertical.

Curvature of the fold axis in the horizontal plane may be accompanied by planform curvature of the spar in the x-y plane. Curvature of the fold axis in the vertical y-z plane may be accompanied by elevation curvature of the cover in the y-z plane. The planform curvature of the spar may substantially match the elevation curvature of the cover.

The plurality of spars may include a front spar and a rear spar. The plurality of spars may further include one or more intermediate spars between the front and rear spars.

The front spar may be integrally formed with one of the upper cover and the lower cover to form a first spar-cover. The rear spar may be integrally formed with the other of the upper cover and the lower cover to form a second spar-cover.

Each of the first spar-cover and the second spar-cover may be arranged such that the composite laminate material of the spar extends continuously into the cover through a fold region created between the spar and the cover. The fold region may have a fold axis extending substantially in the longitudinal direction, and the fold axis projected onto two orthogonal planes may have curvature in both those planes.

Each of the first spar-cover and the second spar-cover may be substantially L-shaped, in cross section. The first and second spar-covers may be attached back-to-back with the spar of the first spar-cover attached to the cover of the second spar-cover; and with the spar of the second spar-cover attached to the cover of the first spar-cover, to form a torsion box extending in the longitudinal direction of the spars. The attachment of the cover to the spar may include an attachment bracket.

Each of the first spar-cover and the second spar-cover may alternatively be substantially Z-shaped, in cross section. The Z-shaped components may have a first limb corresponding to the cover, a second limb corresponding to the spar, and a third limb corresponding to an attachment flange for attachment to the other spar-cover. The first and second spar-covers may be attached back-to-back with the attachment flange of the first spar-cover attached to the cover of the second spar-cover; and with the attachment flange of the second spar-cover attached to the cover of the first spar-cover, to form a torsion box extending in the longitudinal direction of the spars.

The aerofoil shaped body may further comprise one or more attachment brackets for attachment of leading edge or trailing edge structures.

The fold region may form substantially a right angle between the cover and the spar.

Alternatively, the fold region may form an angle between the cover and spar that is between around 60 degrees and around 120 degrees.

The fold region between the cover and the spar may form a radiused corner.

The radiused corner may have a radius which varies along the fold axis.

Theoretically where the angle between the cover and spar of the spar-cover is exactly 90 degrees and the corner has zero radius, the sweep angle curvature of the spar will equal the di/anhedral curvature of the cover. However, in practice the corner must have a non-zero radius for ply continuity through the corner. By varying the angle between the cover and the spar, and by varying the radius of the corner the correlation between the sweep angle curvature of the spar will equal the di/anhedral curvature of the cover can be varied. The angle between the cover and the spar, and the radius of the corner, may be constant along the fold region in the longitudinal direction, or one or both of these parameters may vary in the longitudinal direction to give maximum flexibility in the design of the shape of the aerofoil shaped body.

The thickness of the cover and/or the spar may vary in the longitudinal direction. The thickness may be varied by forming ramps in the stack of composite laminate plies of the spar-cover. Dropping off (terminating) one or more plies in the stack creates a ramp in the stack thickness direction.

A further aspect of the invention provides an aircraft having a wing comprising the aerofoil shaped body according to the first aspect.

The aircraft may have a fuselage and the wing passing substantially over the fuselage (a so-called 'high wing' configuration) and with downlets. Each of the upper cover and the lower cover of the wing including the downlets may be of a single-piece construction.

A further aspect of the invention provides a wing tip device, e.g. a winglet, for attachment to the outboard end of an aircraft wing, where the wing tip device comprises the aerofoil shaped body according to the first aspect. The aircraft wing to which the wing tip device is attached may or may not be an aerofoil shaped body according to the first aspect.

A wing tip device is attached to the outboard end of a wing to reduce induced drag on the wing. In the case of e.g. an aircraft wing this can lead to improved fuel efficiency and reduced carbon emissions. Wing tip devices can take a variety of forms. A winglet is a wing-like element that extends from the wing tip, and may extend upwardly or downwardly from the wing tip. A downwardly extending winglet is more generally known as a 'downlet'. Another example of a wing tip device is a non-planar wing tip extension, i.e. it extends out of the plane of the wing to which it is attached. A winglet may be considered to be a particular example of a non-planar wing tip extension.

A winglet may include a substantially planar portion joined to the wing tip by a curved transition portion to form a blended winglet. Alternatively, a winglet may include a substantially planar portion joined to the wing tip by a non-planar wing tip extension portion. Another example of a wing tip device is a substantially planar wing tip extension, such as a raked wing tip.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
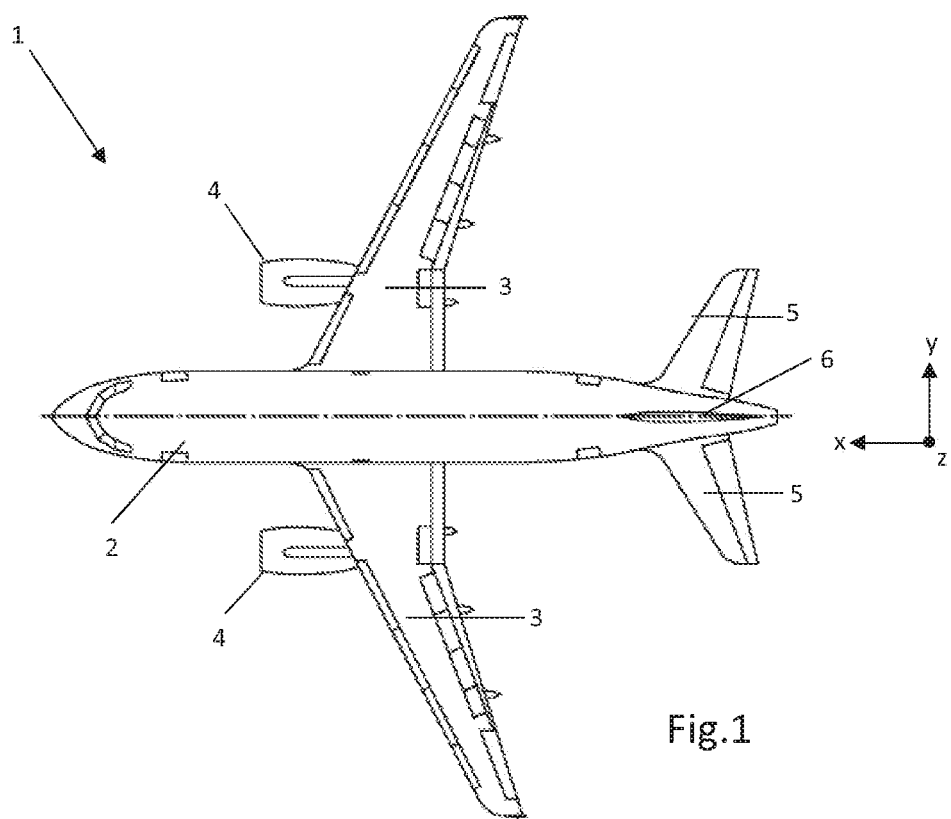
FIG. 1 illustrates a plan view of a fixed wing aircraft.

FIG. 1 illustrates a typical configuration for a fixed wing passenger transonic jet transport aircraft 1. The aircraft 1 comprises a fuselage 2, wings 3, main engines 4, and horizontal and vertical tail planes 5, 6. It will be appreciated that this invention is applicable to a wide variety of aircraft types not just that illustrated in FIG. 1. For example, the aircraft may be for commercial or military purposes, may be for transporting passengers or cargo, may have jet, propeller or other engine propulsion systems, may have a variety of fuselage/wing configurations, e.g. a high wing, low wing or blended wing body, and may be designed to fly at subsonic, transonic or supersonic speeds.

Figure 2:
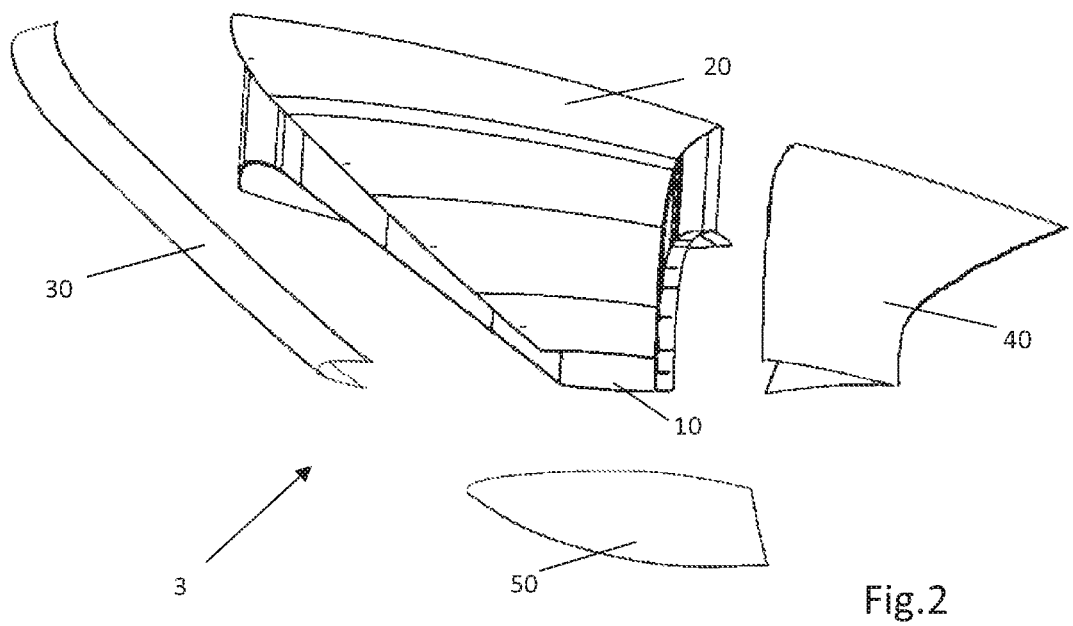
FIG. 2 illustrates an exploded schematic assembly view of a wing of the aircraft.

FIG. 2 illustrates an exploded schematic assembly view of the wing 3 of the aircraft 1. The wing comprises a first spar-cover component 10, a second spar-cover component 20, a leading edge structure 30, a trailing edge structure 40 and a wing tip assembly 50. The wing will typically also include a plurality of chordwise ribs (not shown) extending between the spars and between the covers. Also, the covers may be reinforced with stringers, spanwise extending reinforcing members, attached to the inside of the covers. The ribs and stringers are of conventional type and so will not be described in further detail.

Figure 3:
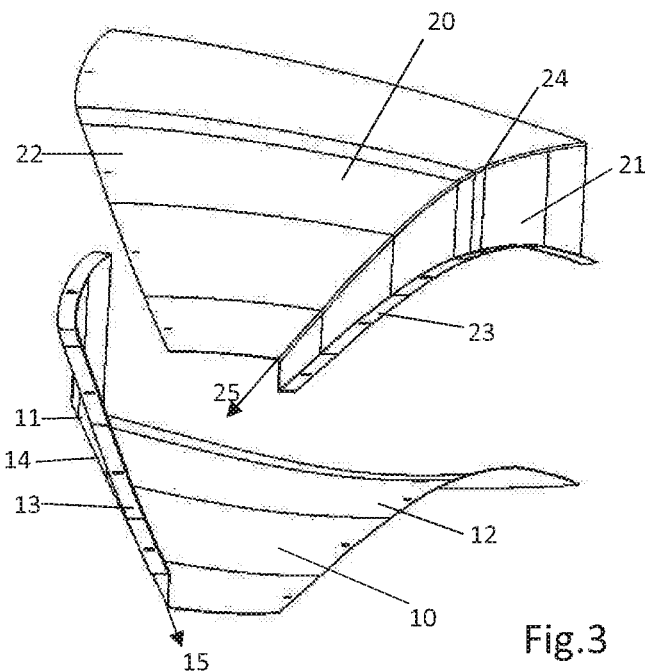
FIGS. 3 and 4 illustrate exploded perspective views of two spar-cover components of the aircraft wing.
Figure 4:
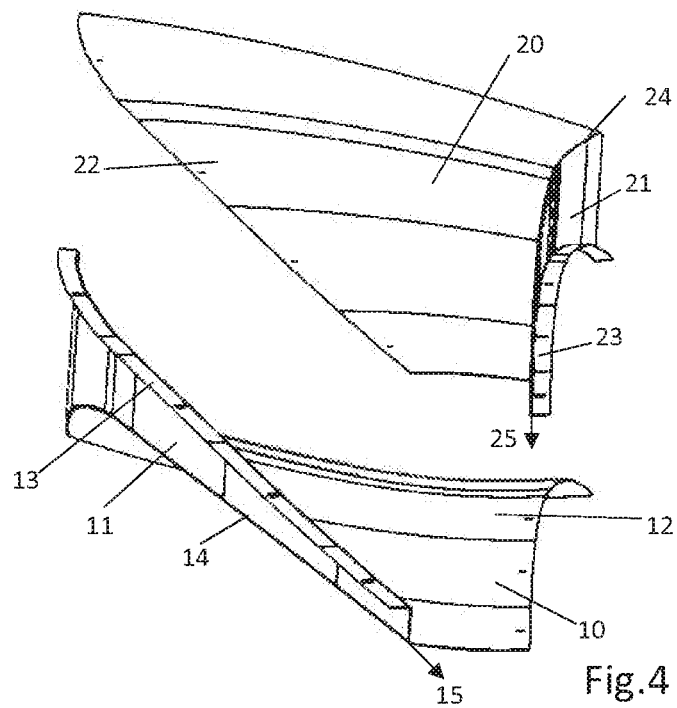

FIGS. 3 and 4 illustrate exploded perspective views of the first and second spar-cover components, 10, 20. The first spar-cover component 10 comprises a front spar 11, a lower wing cover 12 and an upper spar flange 13. The second spar-cover component 20 comprises a rear spar 21, an upper wing cover 22 and a spar lower attachment flange 23. The first spar-cover component 10 is an integrally formed, monolithic component comprising the lower wing cover 12, the front spar 11 and the spar upper attachment flange 13. The first spar-cover component 10 comprises fibre reinforced matrix composite laminate material, such as carbon fibre reinforced polymer.

The composite laminate material of the first spar-cover component 10 extends continuously from the lower wing cover 12 into the front spar 11, and into the spar upper attachment flange 13. A fold region 14 is created between the lower wing cover 12 and the front spar 11. Each of the front and rear spars 11, 21 extends longitudinally. The fold region 14 between the front spar 11 and the lower wing cover 12 has a fold axis 15 extending substantially in the longitudinal direction of the front spar 11.

Figure 5:
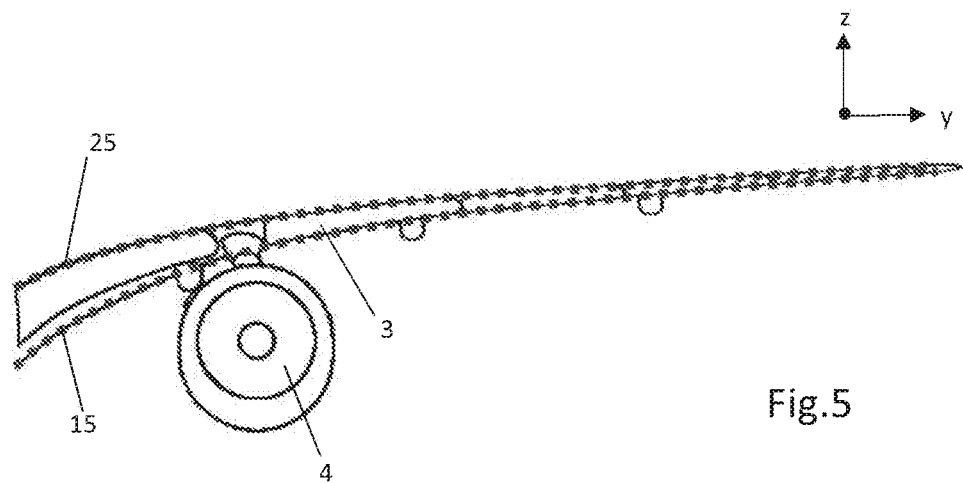
FIG. 5 illustrates the aircraft wing looking aft showing the spanwise dihedral curvature of the upper and lower wing covers.
Figure 6:
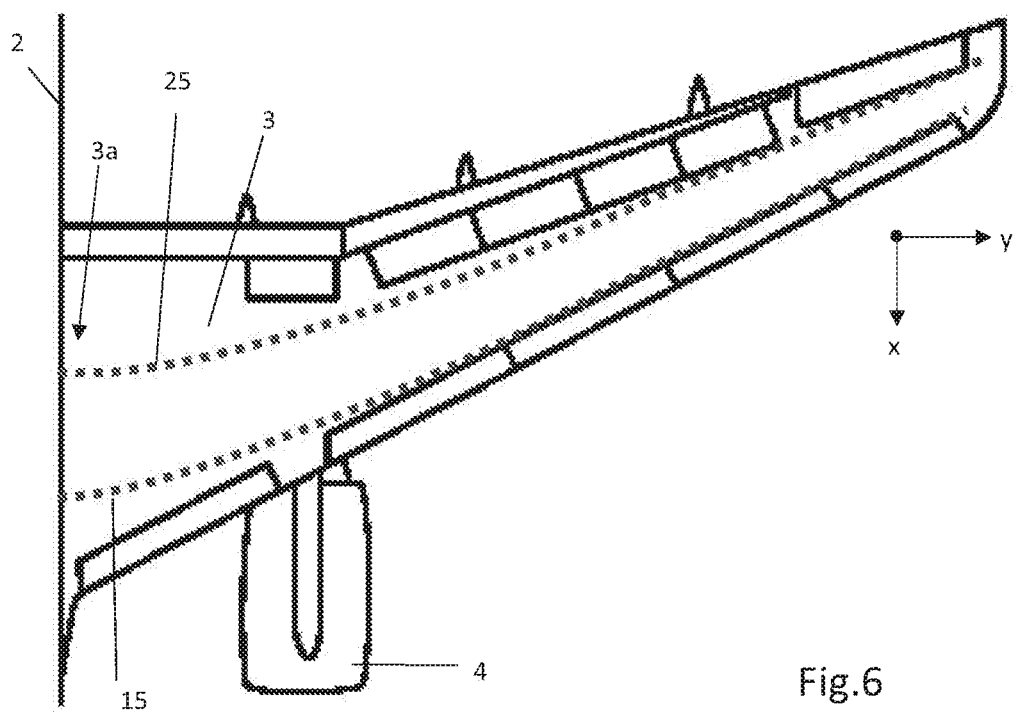
FIG. 6 illustrates a planform view of the aircraft wing showing the spanwise sweep curvature of the front and rear spars.

As best shown in FIGS. 5 and 6, the fold axis 15 is a curved line. The fold axis has curvature when projected onto two orthogonal planes. FIG. 5 is a view of the aircraft wing 3 looking aft normal to the y-z plane. FIG. 6 is a plan view of the aircraft wing 3 normal to the x-y plane. The orthogonal projection of the fold axis 15 onto the y-z plane generates a curved line. Also, the orthogonal projection of the fold axis 15 onto the x-y plane generates a curved line.

In a similar manner, the second spar-cover component 20 is an integrally formed, monolithic component comprising fibre reinforced matrix composite laminate material such as carbon fibre reinforced polymer. The upper wing cover 22 is integrally formed with the rear spar 21 which is integrally formed with the rear spar lower flange 23. The composite laminate material of the upper wing cover 22 extends continuously into the rear spar 21 and into the rear spar lower flange 23. A fold region 24 is formed between the upper wing cover 20 and the rear spar 21. The fold region 24 has a fold axis 25 extending substantially in the longitudinal direction of the rear spar 21. As best shown in FIGS. 5 and 6, the fold axis 25 is a curved line. The orthogonal projection of the fold axis 25 onto the z-y plane is a curved line. Also, the orthogonal projection of the fold axis 25 onto the x-y plane generates a curved line.

Accordingly, the curvature of the fold axes 15, 25 in the horizontal x-y plane ensures planform curvature of the front and rear spars 11, 21 in the horizontal x-y plane. Furthermore, the curvature of the fold axes 15, 25 in the vertical y-z plane ensures elevation curvature of the upper and lower wing covers 12, 22 in the vertical y-z plane.

The aircraft 1 shown in FIG. 1 has a so-called "low wing" configuration in which the wings 3 are attached to the lower portion of the aircraft fuselage 2. For aircraft stability it is well known that canting the wings upwardly from root to tip to create a dihedral angle between the wing and the horizontal x-y plane is beneficial.

By carefully defining the curvature of the fold axes 15, 25 it becomes possible to manufacture the first and second spar-covers 10, 20 from carbon fibre reinforced polymer in one piece without problems of ply "spread", or "bunching" at the fold region as the plies are laid across the cover and into the spar. Whilst this requires that the spars have planform curvature it has been found that this too brings about several advantages.

For example, as can be seen from FIG. 6, the planform curvature of the fold axis 15, 25 is substantially perpendicular to the fuselage 2 at the wing root 3a. For a conventional swept transonic aircraft wing with straight spars, the spars will meet the fuselage at an oblique angle. Since the curved spars 11, 21 meet the fuselage 2 substantially perpendicularly, the curved spars 11, 21 carry the loads from the wings 3 into the fuselage 2 more efficiently. This also achieves a more even distribution of load between the front and rear spars 11, 21, as well as having a geometrically more efficient joint where the rear spar 21 meets the fuselage 2.

By varying the local wing dihedral angle, i.e. the elevation curvature of the upper and lower wing covers 12, 22 in the vertical y-z plane, it is possible to affect the shape of the front and rear spars 11, 21 to allow optimisation of the wing structure. The integral spar-cover components 10, 20 result in simpler part manufacture than for a kinked spar, and removes the need for spar joint plates. Thus the invention reduces parts count, reduces design weight, improves manufacturability, and improves load carrying capability of the integral single piece spar-cover component.

Whilst producing an integral spar-cover introduces a design limitation in that the planform curvature of the spar must be substantially matched to the elevation curvature of the cover, there is still provided some flexibility to decouple these effects to a limited extent. The fold region between the cover and the spar comprises a radiused corner. By varying the radius of the corner the correlation between the sweep angle curvature of the spar and the local di/anhedral angle (elevation curvature) of the cover can be varied. Also, whilst in the illustrated embodiment the fold region forms substantially a right angle between the cover and the spar, this angle between the cover and the spar may be varied between around 60 degrees and around 120 degrees. By varying the angle between the cover and the spar the correlation between the sweep angle curvature of the spar and the di/anhedral curvature of the cover can be varied.

The spar-cover components are formed by laying up a plurality of composite laminate plies, which are then cured before bringing the spar-cover components together back to back and joining them together to form a torsion box for the aircraft wing. The plies may be laid up on a mould tool or over a frame, for example. The plies may be laid up in wet or dry form, by hand or automatically, e.g. using a fibre placement machine. The plies are laid up to form a stack of plies. Once the stack is complete, the stack of plies is cured to form the two spar-cover components. Ribs, stringers or other component may be attached or co-cured to the spar-cover components.

Figure 7:
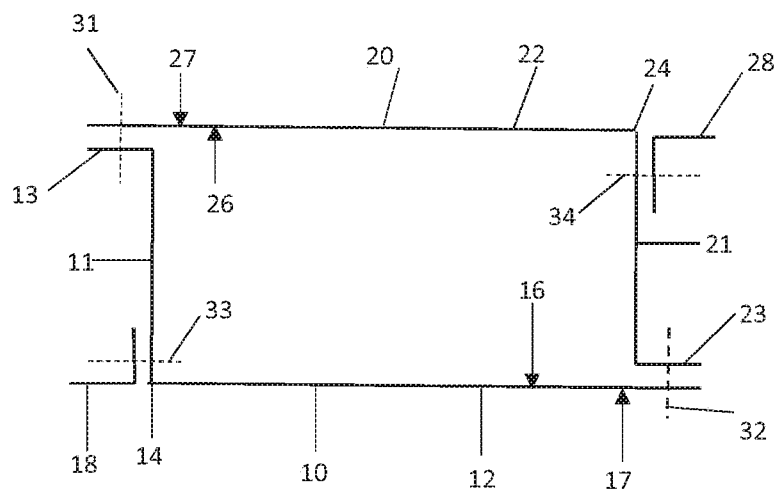
FIG. 7 illustrates a schematic section view of the two Z-shaped spar-covers.

FIG. 7 illustrates schematically a cross section through the two back to back spar-covers 10, 20. As can be seen, each of the spar-cover components 10, 20 is substantially Z-shaped. The Z-shaped components have a first limb corresponding to the cover, a second limb corresponding to the spar, and a third limb corresponding to the attachment flange for the attachment to the other spar-cover component. The two spar-cover components 10, 20 are assembled by bringing the components 10, 20 back to back such that the front spar upper attachment flange 13 is brought adjacent an interior surface 26 of the upper wing cover 20. Similarly, the rear spar lower attachment flange 23 is brought adjacent an interior surface 16 of the lower wing cover 12.

The upper and lower wing covers 22, 12 have outer aerodynamic surfaces 27, 17, respectively. Once the first and second spar-cover components 10, 20 are brought together and into alignment the upper cover 22 and the front spar upper attachment flange 17 are attached as indicated by the broken line 31. Similarly, the lower wing cover 12 and the rear spar lower attachment flange 33 are attached as indicated by the broken line 32. The attachment at locations 31, 32 may be by fastening, bonding, or a combination of the two. It may also be possible to co-cure the first and second spar-cover components 10, 20 together at these locations 31, 32. Not only do the attachment flanges 13, 23 provide a convenient interface for attachment to the upper and lower wing covers but they also provide a suitable attachment location for the leading and trailing edge structures 30, 40.

FIG. 7 further illustrates an upper rear attachment bracket 28 and a lower forward attachment bracket 18. These attachment brackets 18, 28 are provided for attaching the leading and trailing edge structures 30, 40 to the front and rear spars 11, 21. The lower forward attachment bracket 18 is attached to the lower edge of the front spar 11 as an attachment location generally indicated by broken line 33. The upper rear attachment bracket 28 is attached to the upper edge of the rear spar 21 at a location generally indicated by numeral 34. The leading and trailing edge structures 30, 40 together with the outer aerodynamic surfaces 27, 17 of the upper and lower wing covers 20, 10 provide the aerofoil profile of the wing 3.

Figure 8:
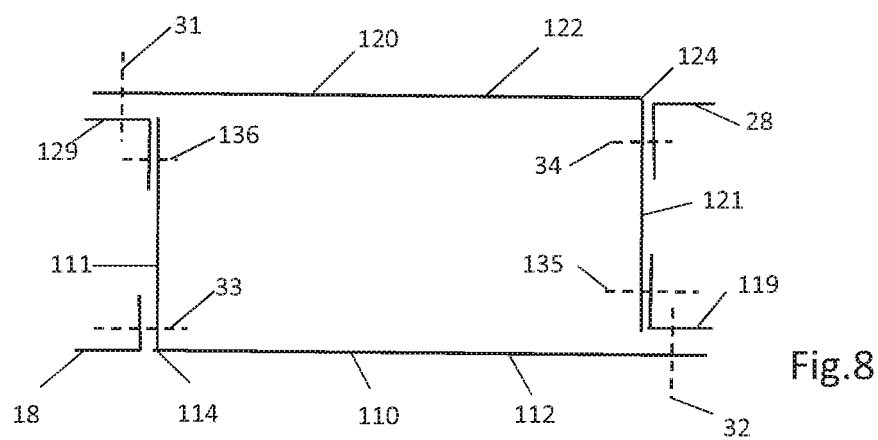
FIG. 8 illustrates a schematic view of a variant in which the spar-covers are L-shaped.

FIG. 8 illustrates a variant in which the spar-cover components are substantially L-shaped, different to the substantially Z-shaped spar-cover components 10, 20 described above. In this variant, like reference numerals have been used to denote like parts with the embodiment described previously, and similar components have been numbered similarly but in the '100 series'.

As shown in FIG. 8, the first spar-cover component 110 includes a front spar 111 integrally formed with the lower wing cover 112 so as to form the first spar-cover 110 such that the composite laminate material of the spar 111 extends continuously into the lower wing cover 112 through a fold region 114 created between the front spar 111 and the lower wing cover 112. Likewise, the second spar-cover component 120 comprises a rear spar 121 integrally formed with the upper wing cover 122 such that the composite laminate material of the spar extends continuously into the upper wing cover 122 through a fold region 124 created between the rear spar 121 and the upper wing cover 122.

The main difference between the embodiment of FIG. 8 and the embodiment of FIG. 7 is that the spar-cover components 110, 120 have no attachment flanges and hence are substantially L-shaped in cross section rather than the substantially Z-shaped components of the embodiment shown in FIG. 7. In addition to the attachment brackets 18, 28 which remain unchanged from the FIG. 7 embodiment, the FIG. 8 embodiment includes two further attachment brackets 119, 129. The rear lower attachment bracket 119 is attached to the lower wing cover 112 at attachment location 32; and to the lower edge of the rear spar 121 at attachment location 135. The forward upper attachment bracket 129 is attached to the upper wing cover 122 at attachment location 31; and to the upper edge of the front spar 111 at attachment location 136.

Similar to the FIG. 7 embodiment the leading and trailing edge structures 30, 40 are attached to the attachment brackets 18, 28, 119, 129. Other than the absence of the attachment flanges integral with the first and second spar covers 110, 120 and the addition of further attachment brackets 119, 129 the construction and assembly of the aircraft wing is identical to that described above with reference to FIGS. 1-7. In particular, the integral spar-covers 110, 120 have fold axes 114, 124 extending substantially in the longitudinal direction and each fold axis projected onto two orthogonal planes has curvatures in both of those planes.

Figure 9:
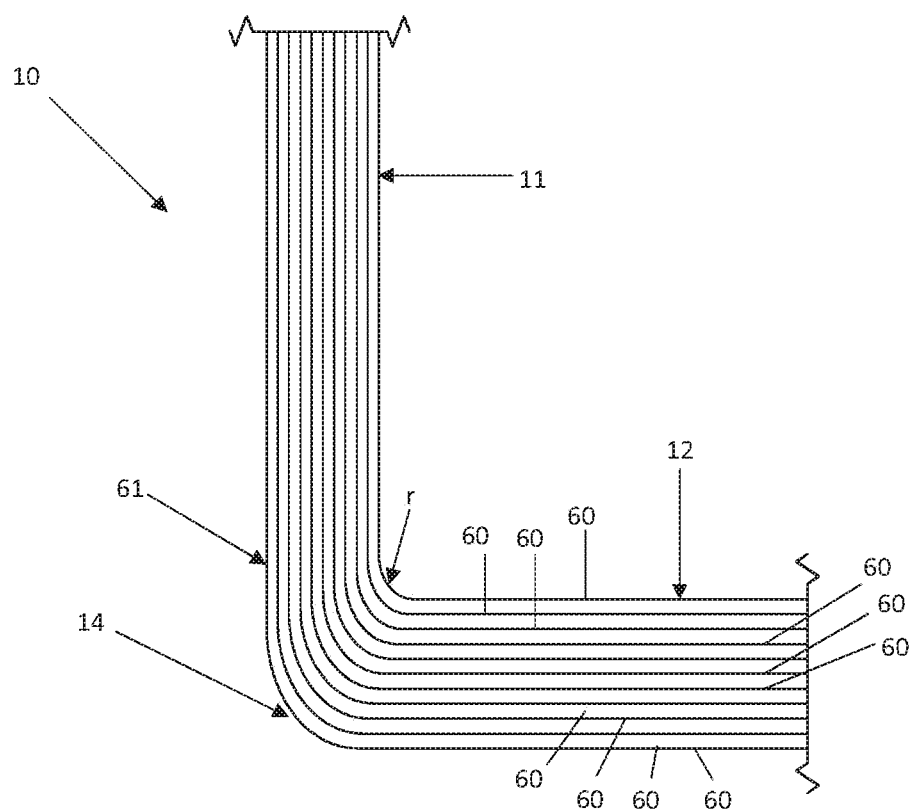
FIG. 9 illustrates a detailed section view of the fold region of the spar-cover showing continuity of plies though the corner.

FIG. 9 illustrates in detail a section through the first spar-cover component 10 adjacent the fold region 14 between the front spar 11 and the lower wing cover 12. In this detailed view of FIG. 9, the individual laminate composite plies 60 is shown with each ply 60 extending continuously from the spar 11 into the cover 12 through the fold region 14. The fold region 14 between the cover and the spar forms a radiused corner 61 of radius, r. As described previously, in some embodiments the radius, r, may be constant along the fold axis 15 (extending into the page as shown in FIG. 9) along the entire length of the fold region 14 of the spar-cover component 10. Alternatively, the radius, r, may vary along the axis 15.

Figure 10:
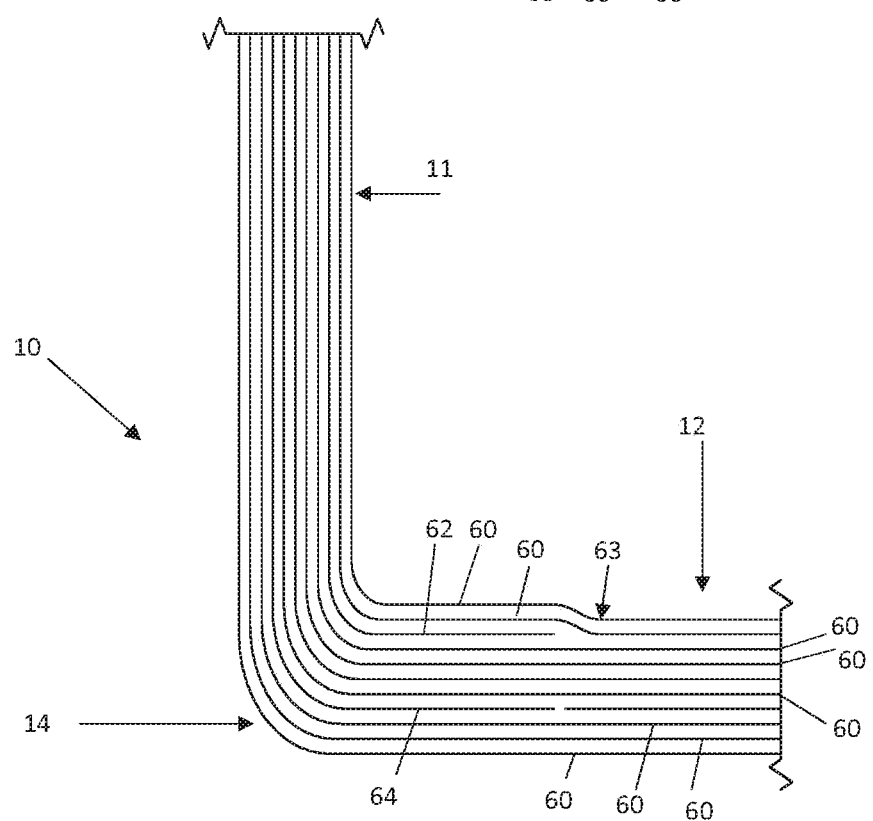
FIG. 10 illustrates a detailed section view of the fold region according to a variant in which some plies are terminated or substituted.

FIG. 10 illustrates an alternative embodiment in which some of the plies 60 are continuous from the spar 11 into the cover 12, whereas at least one of the plies 62 is terminated forming a ramp 63 in the thickness of the cover 12 and another of the plies 64 is substituted. Ply substitution involves the termination of one ply and substitution with another ply (typically of different characteristic, e.g. modulus, material etc., than the substituted ply) without any variation in the overall thickness of the stack of plies. However, what is important is that some of the plies 60 extend continuously from the spar into the cover through the fold region 14. The arrangement of plies in FIGS. 9 and 10 is applicable to any of the embodiments described previously.

Figure 11:
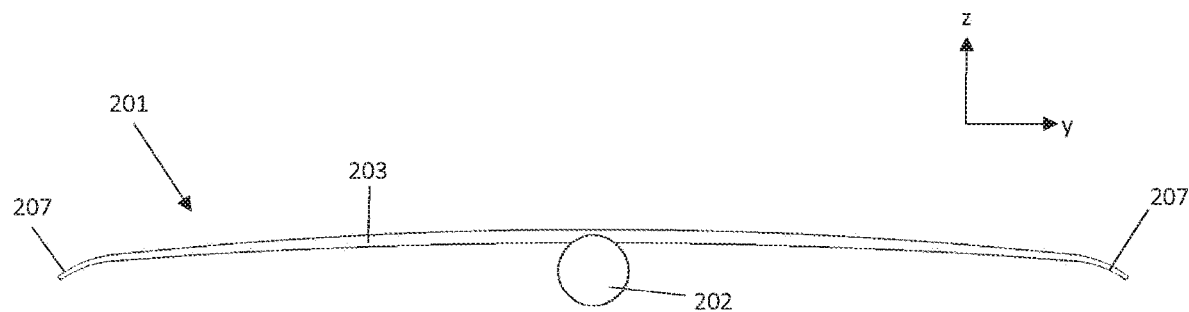
FIG. 11 illustrates a schematic view looking aft of an aircraft wing and fuselage section having a high wing with integrally formed downlets.

FIG. 11 illustrates a schematic view looking aft of an aircraft wing 203 and fuselage section 202 for an aircraft 201 having a "high-wing" configuration in which the wing 203 passes over or near the top of the fuselage 202. The left and right wing portions (either side of the fuselage 202) are integrally formed and at each wing tip the wing 203 has downlets 207.

Figure 12:
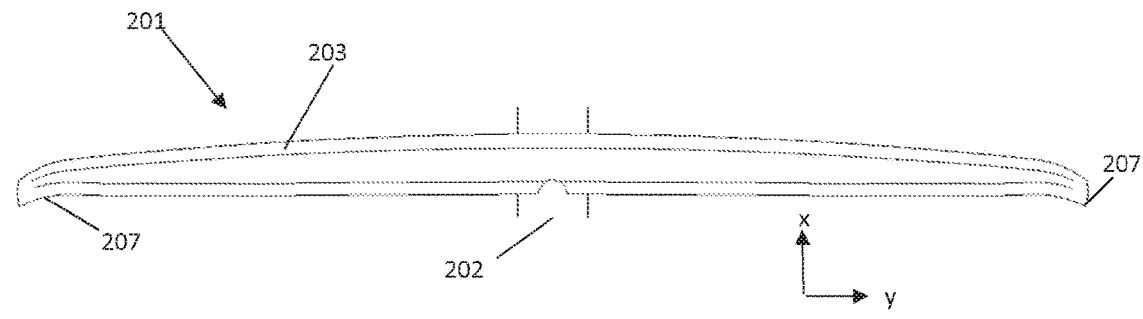
FIG. 12 illustrates a schematic planform view of the aircraft section of FIG. 11.
Figure 13:
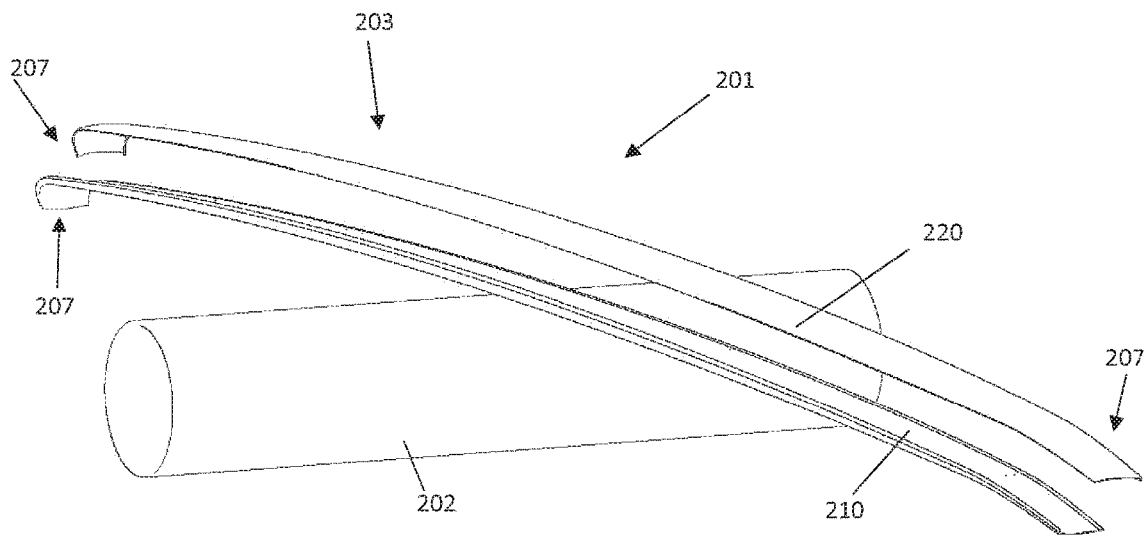
FIG. 13 illustrates an exploded schematic perspective view of the aircraft section of FIG. 11.

FIG. 12 illustrates a schematic planform view of the aircraft 201. FIG. 13 illustrates an exploded schematic perspective view of the aircraft 201 illustrating that the wing 203 comprises a first spar-cover component 210 and a second spar-cover component 220. Each of the spar-cover components 210, 220 is similar in construction to the spar-cover components 10, 20 described above and has a substantially Z-shaped section. The first and second spar-cover components 210, 220 are joined together in a virtually identical manner to that illustrated in FIG. 7. However, it will be appreciated that the spar-cover components 210, 220 could alternatively be formed having a substantially L-shaped section and which may be assembled in a similar manner to that illustrated in FIG. 8.

Due to the dihedral angle of a "low wing" aircraft configuration, the aircraft 1 illustrated in FIGS. 1-7 has the lateral wings 3 formed as separate assemblies which are joined to the fuselage 2, typically by attachment to a centre wing box assembly of the aircraft fuselage. The dihedral angle of the wings 3 create an angular discontinuity at the aircraft fuselage 2. However, with a "high-wing" aircraft configuration such as that illustrated in FIGS. 11-13, no such discontinuity exists and so it becomes possible to form the first and second spar-cover components 210, 220 extending from tip-to-tip continuously.

The aircraft wing 203 creates an anhedral angle with the horizontal plane on either side of the aircraft fuselage 202. The wing 203 is slightly aft swept but this aft sweep is not so pronounced compared with that of the wings 3 of the aircraft 1. The downlets 207 at each wing tip are integrally formed with the spar-cover components 210, 220. The downlets 207 are curved downwardly and are swept aft towards each wing tip. This is made possible since the curvature of the fold region between the spar and cover of each spar-cover component 210, 220 substantially matches beneficially in this configuration. Conversely, for the low dihedral wing 3 for the aircraft 1, integral upwardly extending winglets are unlikely to be favoured as the curvature matching in the fold region between the spar and cover would cause such upwardly extending winglets to be swept forwardly. However, if forward swept winglets on an aft swept wing are desired then integral winglets would also become a possibility for the aircraft 1 described previously.

Figure 14:
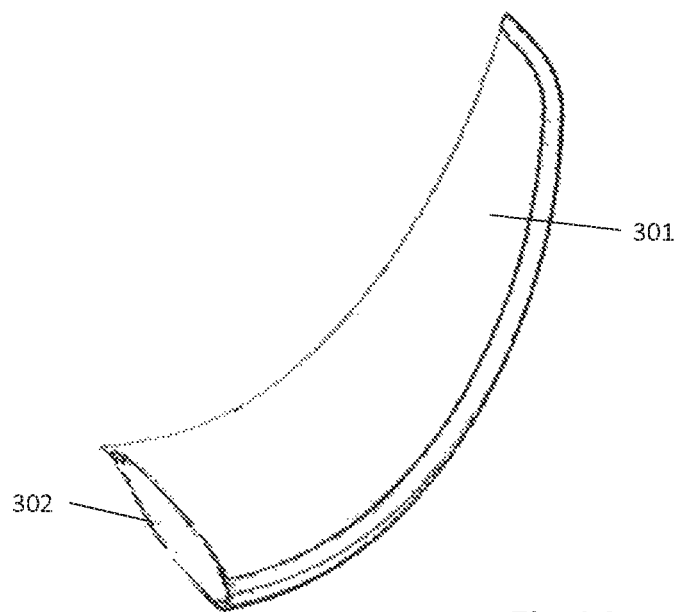
FIG. 14 illustrates a three-dimensional view of a winglet fitted to the tip end of an aircraft wing.

FIG. 14 illustrates an upwardly extending winglet 301 attached to a tip end of an aircraft wing 302. The wing 302 is an aft swept, dihedral wing and may be arranged similarly to the wing 3 described previously. The winglet 301 may be used as an alternative to the wing tip assembly 50 shown in FIG. 2. Alternatively, the winglet 301 may be for attachment to the tip of an aircraft wing manufactured not in accordance with this invention, i.e. with separate covers and spars. The winglet 301 is aft swept.

Figure 15:
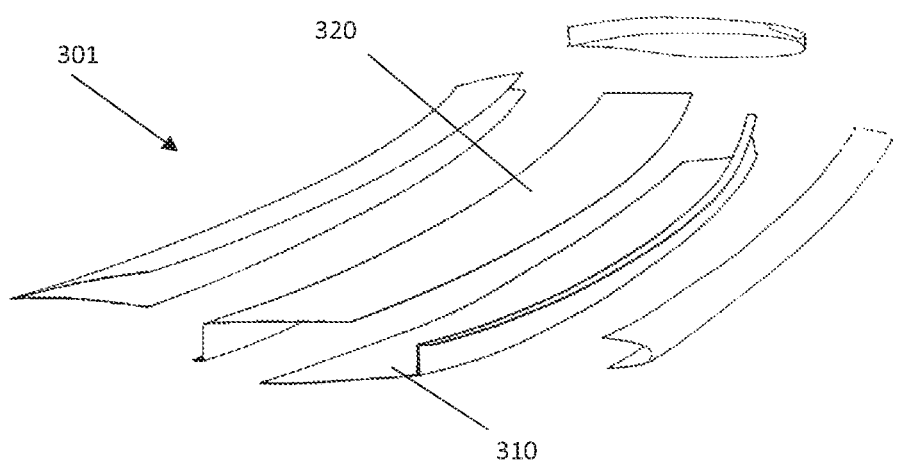
FIG. 15 illustrates an exploded perspective view of two spar-cover components of the winglet of FIG. 14.

FIG. 15 illustrates a schematic view of a first spar-cover component 310 and a second spar-cover component 320 of the winglet 301. The spar-cover components 310, 320 are constructed near identically to the spar-cover components 10, 20 of the wing 3 described previously and so their construction will not be repeated here. The spar-cover components 310, 320 however have a greater elevation curvature substantially matched to a greater planform curvature than for the wing 3. Leading edge, trailing edge and tip structures (not shown) are added to the spar-cover components 310, 320 to complete the winglet 301. Ribs and stringers of conventional type may also be included in the winglet 301.

Although the invention has been described above with reference to one or more preferred embodiments, it will be appreciated that various changes or modifications may be made without departing from the scope of the invention as defined in the appended claims.

The invention claimed is:

1. An aerofoil shaped body comprising a plurality of longitudinal spars, an upper aerofoil cover, and a lower aerofoil cover, the spars and the covers comprising composite laminate material, wherein at least one of the spars is integrally formed with one of the covers to form a spar-cover such that the composite laminate material of the spar extends continuously into the cover through a fold region created between the spar and the cover, and wherein the fold region has a fold axis extending substantially in the longitudinal direction, and the fold axis projected onto two orthogonal planes has curvature in both those planes.

2. An aerofoil shaped body according to claim 1, wherein the two orthogonal planes comprise a horizontal x-y plane and a vertical y-z plane.

3. An aerofoil shaped body according to claim 2, wherein curvature of the fold axis in the horizontal plane is accompanied by planform curvature of the spar in the x-y plane, and wherein curvature of the fold axis in the vertical plane is accompanied by elevation curvature of the cover in the y-z plane, and the planform curvature of the spar substantially matches the elevation curvature of the cover.

4. An aerofoil shaped body according to claim 1, wherein the plurality of spars includes a front spar and a rear spar.

5. An aerofoil shaped body according to claim 4, wherein the front spar is integrally formed with one of the upper cover and the lower cover to form a first spar-cover; and wherein the rear spar is integrally formed with the other of the upper cover and the lower cover to form a second spar-cover.

6. An aerofoil shaped body according to claim 5, wherein each of the first spar-cover and the second spar-cover are arranged such that the composite laminate material of the spar extends continuously into the cover through a fold region created between the spar and the cover, and wherein the fold region has a fold axis extending substantially in the longitudinal direction and the fold axis has curvature in two orthogonal planes.

7. An aerofoil shaped body according to claim 5, wherein each of the first spar-cover and the second spar-cover are substantially L-shaped.

8. An aerofoil shaped body according to claim 5, wherein each of the first spar-cover and the second spar-cover are substantially Z-shaped, the Z-shaped components having a first limb corresponding to the cover, a second limb corresponding to the spar, and a third limb corresponding to an attachment flange for attachment to the other spar-cover.

9. An aerofoil shaped body according to claim 1, further comprising one or more attachment brackets for attachment of leading edge or trailing edge structures.

10. An aerofoil shaped body according to claim 1, wherein the fold region forms substantially a right angle between the cover and the spar.

11. An aerofoil shaped body according to claim 1, wherein the fold region forms an angle between the cover and spar that is between around 60 degrees and around 120 degrees.

12. An aerofoil shaped body according to claim 1, wherein the fold region between the cover and the spar forms a radiused corner.

13. An aerofoil shaped body according to claim 12, wherein the radiused corner has a radius which varies along the fold axis.

14. An aerofoil shaped body according to claim 1, wherein the thickness of the cover and/or the spar varies in the longitudinal direction.

15. An aircraft having a wing comprising the aerofoil shaped body according to claim 1.

16. An aircraft according to claim 15, wherein the aircraft has a fuselage and the wing passes substantially over the fuselage and has downlets, wherein each of the upper cover and the lower cover of the wing including the downlets are of a single-piece construction.

17. A winglet for attachment to the outboard end of an aircraft wing, the winglet comprising the aerofoil shaped body according to claim 1.

18. A method of manufacturing an aerofoil shaped body according to claim 1, comprising laying up a plurality of composite laminate plies to form a first spar-cover, laying up a plurality of composite laminate plies to form a second spar-cover, bringing the first spar-cover and the second spar-cover together to form a torsion box of the aerofoil shaped body.

19. A method according to claim 18, wherein the aerofoil shaped body is an aircraft wing or a winglet.

\* \* \* \* \*